(12) United States Patent
Schmadeke

(10) Patent No.: US 11,433,830 B2
(45) Date of Patent: Sep. 6, 2022

(54) WIRE HARNESS TRAY ASSEMBLY

(71) Applicant: Deere & Company, Moline, IL (US)

(72) Inventor: Eric J. Schmadeke, Waterloo, IA (US)

(73) Assignee: Deere & Company, Moline, IL (US)

( * ) Notice: Subject to any disclaimer, the term of this patent is extended or adjusted under 35 U.S.C. 154(b) by 35 days.

(21) Appl. No.: 16/949,474

(22) Filed: Oct. 30, 2020

(65) Prior Publication Data
US 2022/0105883 A1 Apr. 7, 2022

Related U.S. Application Data

(60) Provisional application No. 63/198,186, filed on Oct. 1, 2020.

(51) Int. Cl.
B60R 16/02 (2006.01)
(52) U.S. Cl.
CPC .............................. B60R 16/0215 (2013.01)
(58) Field of Classification Search
CPC .. B60R 16/0215; B60R 16/0231; H01R 13/64
USPC ....................................................... 174/72 A
See application file for complete search history.

(56) References Cited

U.S. PATENT DOCUMENTS

| | | | | |
|---|---|---|---|---|
| 2,834,622 A * | 5/1958 | Reeves | ............... | H02G 3/0608 248/68.1 |
| 3,370,121 A * | 2/1968 | Merckle | ............... | H02G 9/065 174/101 |
| 4,077,434 A * | 3/1978 | Sieckert | ............... | H02G 3/0418 138/158 |
| 4,156,795 A * | 5/1979 | Lacan | ............... | H01R 25/161 174/101 |
| 4,815,984 A * | 3/1989 | Sugiyama | ............... | B60R 16/0239 296/146.7 |
| 5,067,678 A * | 11/1991 | Henneberger | ............... | G02B 6/4459 248/68.1 |
| 5,347,969 A * | 9/1994 | Gmelin | ............... | H01R 13/66 123/456 |
| 6,049,040 A * | 4/2000 | Biles | ............... | H02G 3/0487 174/101 |
| 6,470,129 B1 * | 10/2002 | Wentworth | ............... | H02G 3/0437 385/134 |
| 6,603,073 B2 * | 8/2003 | Ferris | ............... | H02G 3/0608 174/72 A |
| 7,226,022 B2 * | 6/2007 | Bernard | ............... | H02G 3/0608 403/387 |
| 7,246,778 B2 * | 7/2007 | Caveney | ............... | H02G 3/0608 439/864 |
| 7,250,574 B2 * | 7/2007 | Fox | ............... | H02G 9/04 174/101 |

(Continued)

FOREIGN PATENT DOCUMENTS

CN 203504096 U 3/2014
KR 101320880 10/2013

Primary Examiner — Timothy J Thompson
Assistant Examiner — Michael F McAllister

(57) ABSTRACT

A wire harness tray assembly comprising a first tray base comprising a first plurality of wire egress openings, a wire connector feature, an engine mount feature configured to removably engage a fastener, a first tray cover comprising a connector mounting clip, a second plurality of wire egress openings, where each of the second plurality of wire egress openings corresponds to the first plurality of wire egress openings, wherein the first tray base couples with the first tray cover.

9 Claims, 5 Drawing Sheets

(56) References Cited

U.S. PATENT DOCUMENTS

| | | | | |
|---|---|---|---|---|
| 7,542,650 | B2 * | 6/2009 | Ellison | G02B 6/4459 |
| | | | | 248/65 |
| 9,120,435 | B2 * | 9/2015 | Shirey | B60R 16/0207 |
| 9,166,387 | B2 * | 10/2015 | Murakoshi | B60R 16/0215 |
| 9,566,917 | B2 * | 2/2017 | Chaanine | H02G 3/04 |
| 10,103,526 | B2 * | 10/2018 | Suzuki | H01B 7/0045 |
| 10,693,285 | B2 * | 6/2020 | Jaeker | H02G 3/0608 |
| 2002/0116795 | A1 * | 8/2002 | Nelson | H02G 3/32 |
| | | | | 24/306 |
| 2003/0183411 | A1 * | 10/2003 | Frantz | H02G 3/0475 |
| | | | | 174/72 A |
| 2005/0217888 | A1 * | 10/2005 | Arai | H02G 3/0418 |
| | | | | 174/72 A |
| 2005/0241715 | A1 * | 11/2005 | Suzuki | B60R 16/0215 |
| | | | | 138/156 |
| 2006/0219423 | A1 * | 10/2006 | Suzuki | B60R 16/0215 |
| | | | | 174/72 A |
| 2012/0217033 | A1 * | 8/2012 | Agusa | B60R 16/0215 |
| | | | | 174/68.3 |
| 2013/0206928 | A1 * | 8/2013 | Murakoshi | F16L 3/1025 |
| | | | | 248/65 |
| 2016/0134089 | A1 * | 5/2016 | Peterson | B60R 16/0207 |
| | | | | 174/72 A |
| 2016/0315421 | A1 * | 10/2016 | Andou | H01R 11/12 |
| 2017/0222412 | A1 * | 8/2017 | Jaeker | H02G 3/0437 |

* cited by examiner

WIRE HARNESS TRAY ASSEMBLY

CROSS-REFERENCE TO RELATED APPLICATIONS

This is a non-provisional application based upon U.S. provisional patent application No. 63/198,186 filed on Oct. 1, 2020, which is hereby incorporated by reference as though fully set forth herein.

TECHNICAL FIELD

The present disclosure generally relates to a utility vehicle. An embodiment of the present disclosure relates to a wire harness tray assembly for utility vehicles.

BACKGROUND

Utility vehicles, such as construction vehicles and agricultural vehicles, include an engine with a wire harness where the wire harness includes various wires and connectors.

SUMMARY

Various aspects of examples of the present disclosure are set out in the claims.

According to a first aspect of the present disclosure, A wire harness tray assembly comprising a first tray base comprising a first plurality of wire egress openings; a wire connector feature; an engine mount feature configured to removably engage a fastener; a first tray cover comprising a connector mounting clip; a second plurality of wire egress openings, where each of the second plurality of wire egress openings corresponds to the first plurality of wire egress openings; wherein the first tray base removably couples with the first tray cover.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
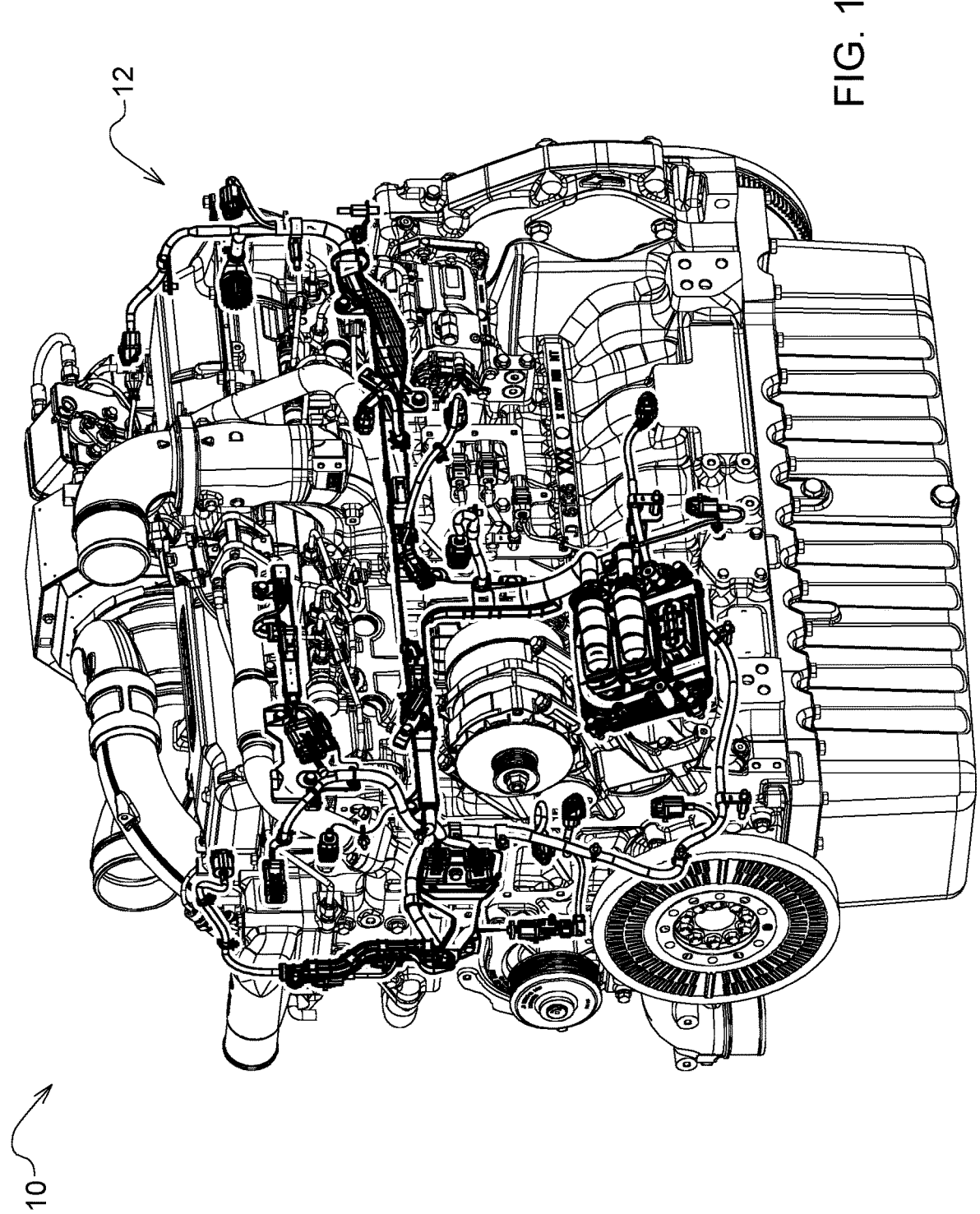
FIG. 1 is an isometric view of an engine with a wire harness tray assembly, consistent with embodiments of the present disclosure.
Figure 2:
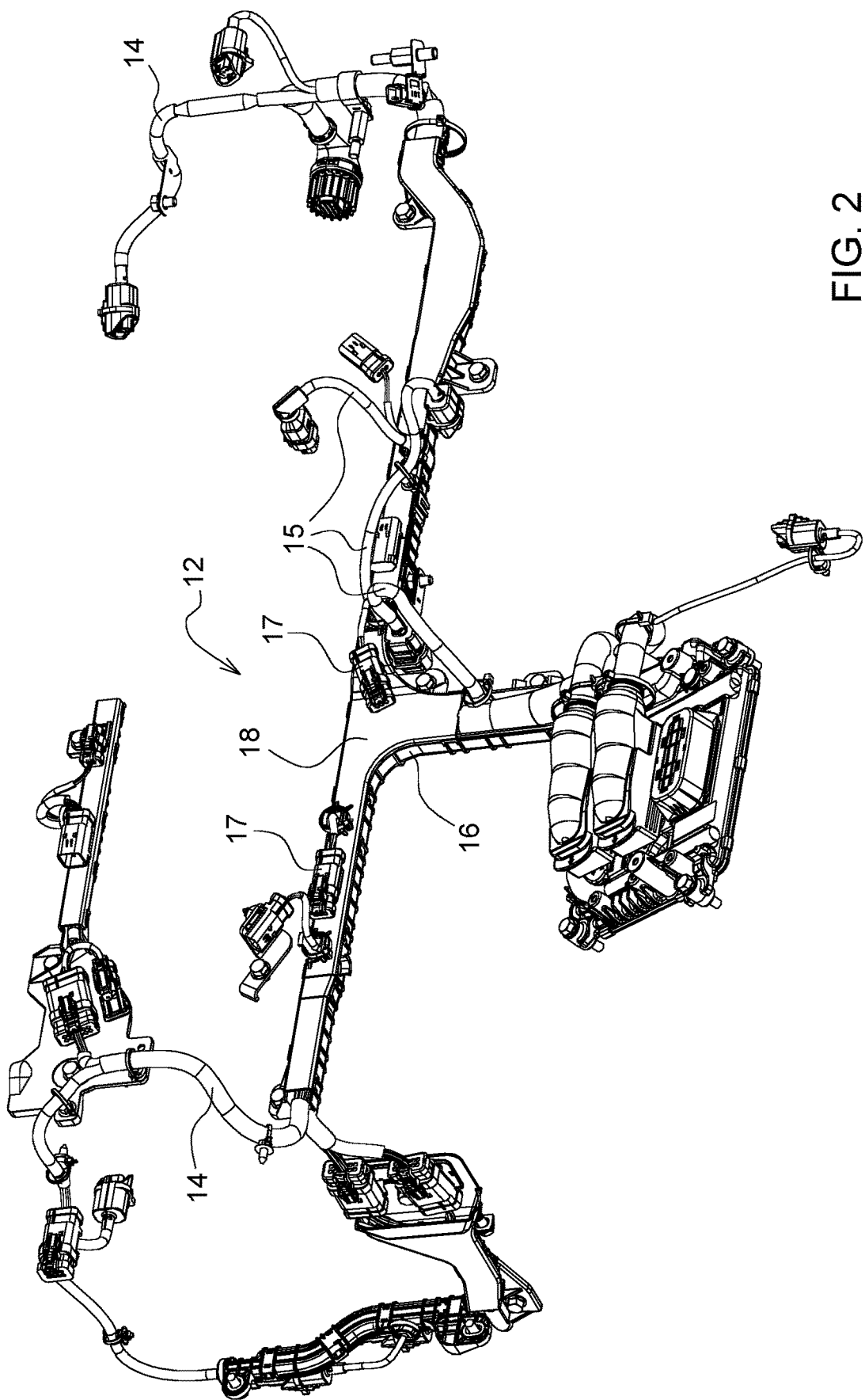
FIG. 2 is an isometric view of the wire harness tray assembly of FIG. 1, consistent with embodiments of the present disclosure. The wire harness 14 can include wire 15 and wire connectors 17. The wire harness tray assembly 12 can include a first tray base 16 and a first tray cover 18. The first tray base 16 and the first tray cover 18 can comprise a polymer material.

At least one example embodiment of the subject matter of this disclosure is understood by referring to FIGS. 1 through 3 of the drawings.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

FIG. 1 is an isometric view of an engine with a wire harness tray assembly, consistent with embodiments of the present disclosure. FIG. 1 illustrates an engine 10 from a utility vehicle. The utility vehicle may include, for example, tractors, sprayers, combines, harvesters, pickers, bulldozers, crawlers, feller bunchers, scrapers, excavators, skid and track loaders, or any other utility vehicle that includes an engine. The engine 10 can include a wire harness tray assembly 12 containing portions of a wire harness 14.

FIG. 2 is an isometric view of the wire harness tray assembly of FIG. 1, consistent with embodiments of the present disclosure. The wire harness 14 can include wire and wire connectors. The wire harness tray assembly 12 can include a first tray base 16 and a first tray cover 18. The first tray base 16 and the first tray cover 18 can comprise a polymer material.

The first tray base 16 can be removably or non-removably coupled with the first tray cover 18. The first tray base 16 and the first tray cover 18 can be coupled via interlocking features to hold the first tray base 16 and the first tray cover 18 together.

Figure 3A:
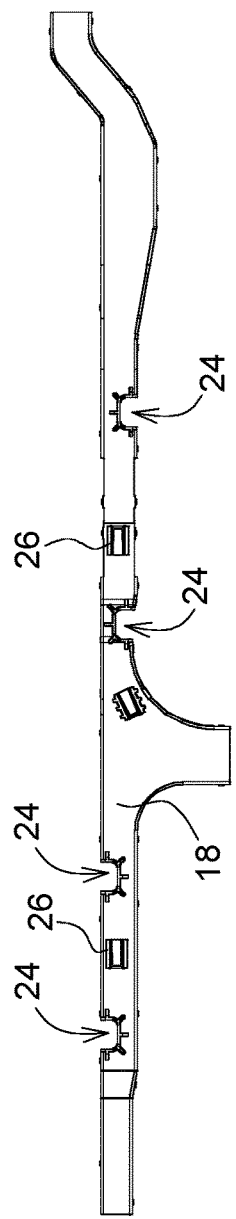
FIGS. 3A-C are side views of a wire harness tray assembly, consistent with embodiments of the present disclosure.
Figure 3B:
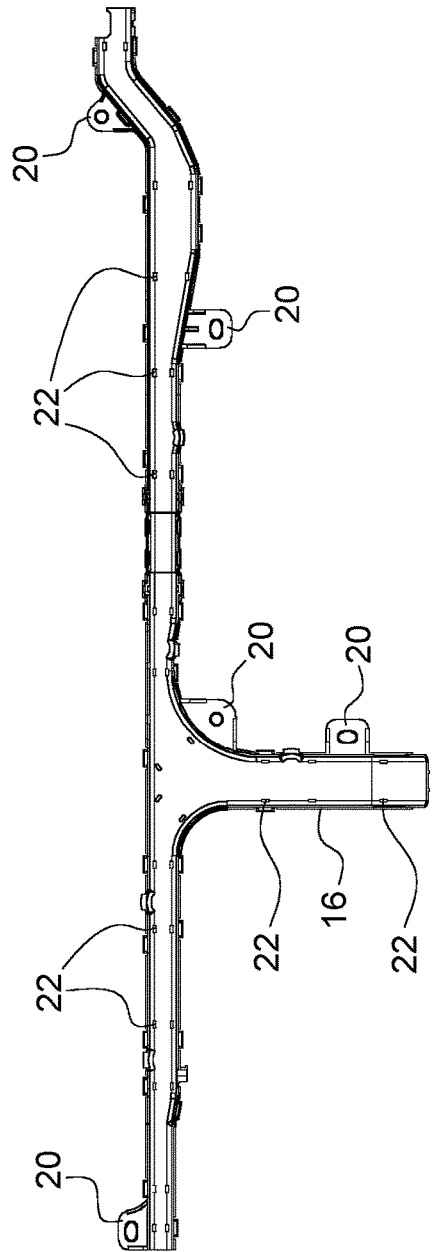
Figure 3C:
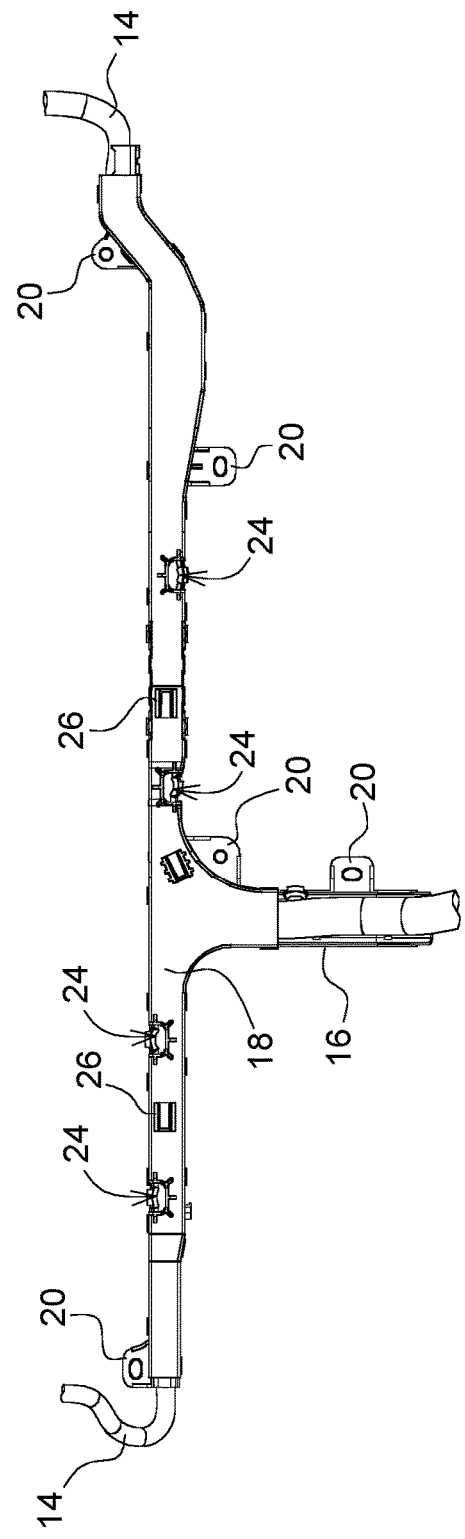

FIG. 3A-C are side views of a wire harness tray assembly, consistent with embodiments of the present disclosure. FIG. 3A shows a wire harness tray 12 including engine mounting locations 20, tie band locations for wiring attachment 22, and wire egress locations 24. FIG. 3B shows a wire tray cover including wire egress locations 24 and connector mounting clips 26. FIG. 3C shows a wire harness tray assembly 12 that includes the wire harness tray base 16 and the wire harness tray cover 18 of FIGS. 3A and 3B, including engine mounting locations 20, wire egress locations 24, and connector mounting clips 26. A fastener can be used to removably couple the engine mounting locations 20 of the wire harness tray assembly with an engine 10.

Wires 15 included in the wire harness 14 can be coupled with the wire harness tray assembly 12 by, for example, tie bands (e.g., zip ties, cable ties, etc.) or other similar devices at the tie band locations 22 for wiring attachment. The wire harness tray assembly 12 can include openings to accommodate tie bands to allow the wires/wire harness to be coupled with the wire harness tray assembly 12 at the tie band locations 22. Various portions of the wire harness 14 can protrude from the wire harness tray assembly at wire egress locations 24.

The connector mounting clips 26 can comprise a feature formed on a portion of the wire harness tray assembly, for example, on the wire harness tray cover 18. The connector mounting clips 26 can facilitate coupling of various wire connectors with the wire harness tray assembly 12 to provide a method of limiting movement of the wire connectors.

The wire harness tray assembly can comprise more than one wire harness tray bases 16 and wire harness tray covers 18. For example, a first wire harness tray portion can be coupled with a second wire tray harness portion. The first wire harness tray portion and the second wire tray harness portion can be coupled with a wire harness tray assembly coupler (e.g., coupler 28 in FIG. 4). The wire harness tray assembly coupler 28 can comprise the same material as the wire harness tray assembly 12 or it can comprise a different material (e.g., metal).

Figure 4:
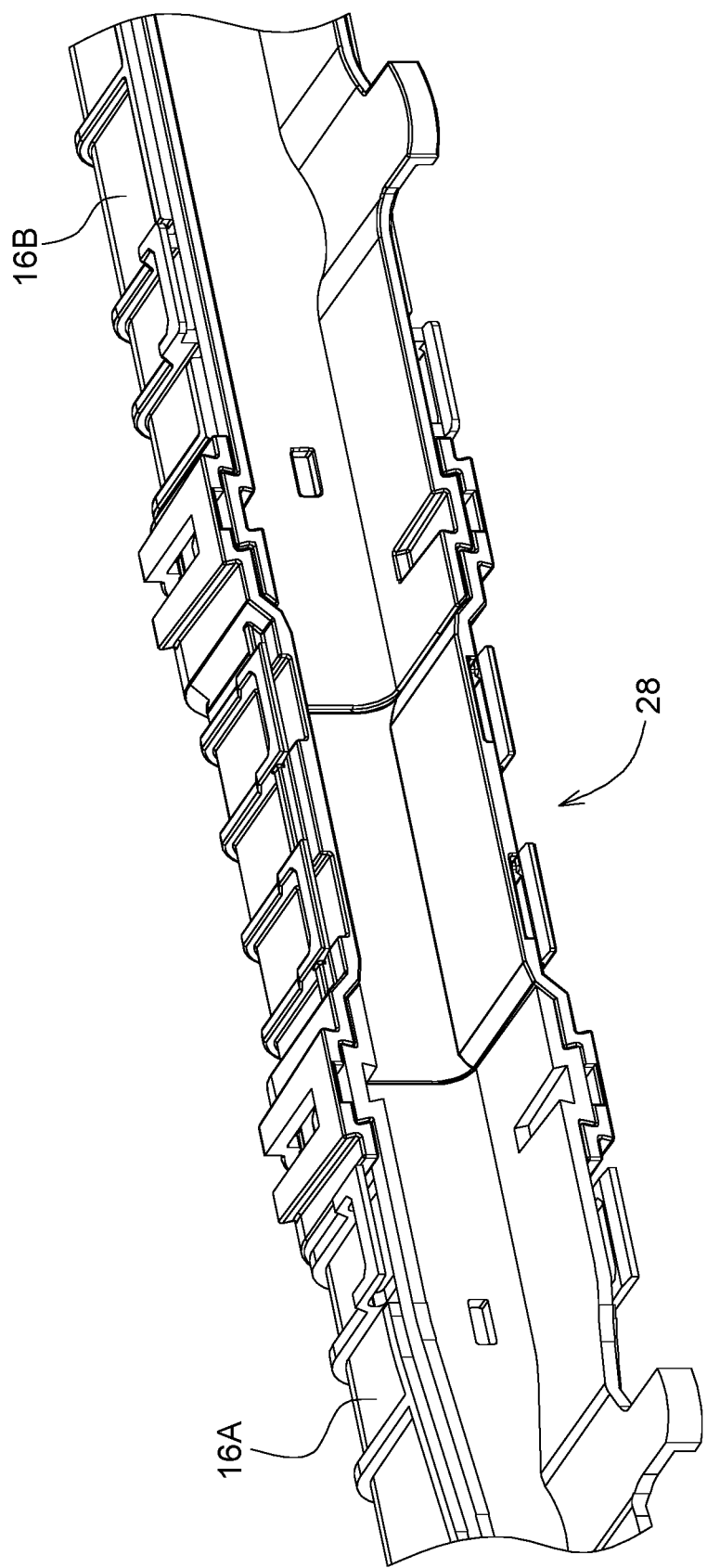
FIG. 4 is an isometric view of a first wire harness tray portion and a second wire harness tray portion coupled by a wire harness tray assembly coupler; consistent with embodiments of the present disclosure.

FIG. 4 is an isometric view of a first wire harness tray portion and a second wire harness tray portion coupled by a wire harness tray assembly coupler; consistent with embodiments of the present disclosure. A first wire harness tray base portion 16A can be coupled with a second wire harness tray base portion 16B by wire harness tray assembly coupler 28. The coupler 28 can connect with the first wire harness tray portion 16A and the second wire harness tray portion 16B through various interlocking features.

Figure 5:
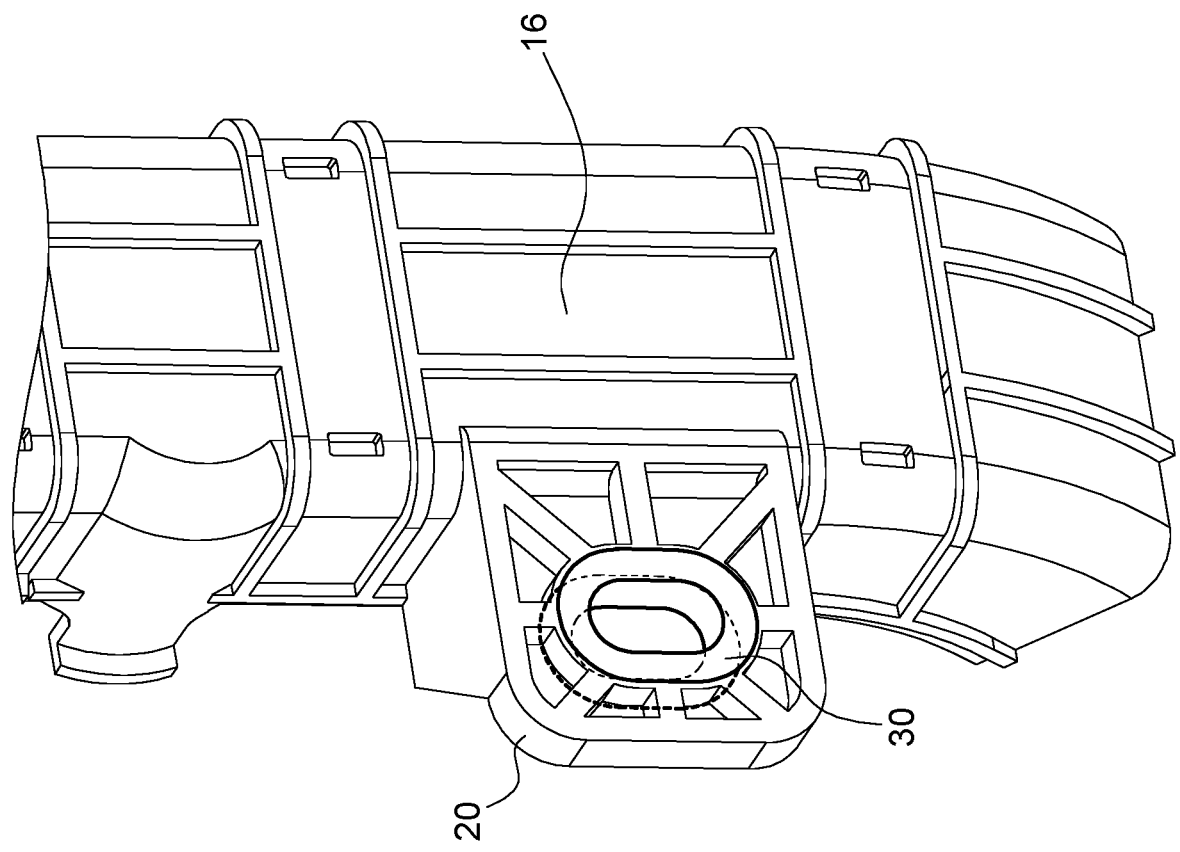
FIG. 5 is a side view of a portion of a wire harness tray assembly with a torque limiting feature, consistent with embodiments of the present disclosure. The torque limiting feature can include, for example, a metal sleeve or insert that is coupled with the wire harness tray assembly. The torque limiting feature can limit a torque applied to a fastener used to couple the harness tray assembly with an engine. For example, the metal sleeve can prevent the fastener from deforming a portion of the wire harness tray as the fastener is tightened.

FIG. 5 is side view of a portion of a wire harness tray assembly 12 with a torque limiting feature, consistent with embodiments of the present disclosure. The torque limiting feature can include, for example, a metal sleeve or insert 30 that is coupled with the wire harness tray base 16. The torque limiting feature can limit a torque applied to a fastener (not shown) used to couple the wire harness tray assembly 12 with an engine 10. For example, the metal sleeve 30 can prevent the fastener from deforming or damaging a portion of the wire harness tray assembly 12 as the fastener is tightened to secure the wire harness tray assembly to the engine 10.

The wire harness tray assembly 12 can also provide protection for wire connectors. The protection provided can include preventing and/or limiting paint spray applied to portions of the utility vehicle during the manufacturing process from interfering with the function of the wire connectors. Similarly, the wire harness tray assembly 12 can also shield the wire connector from contaminants (e.g., oil, water, dirt, etc.) during operation of the utility vehicle.

What is claimed is:

1. A wire harness tray assembly comprising:
a first tray base comprising
a first plurality of wire egress openings;
a wire connector feature;
an engine mount feature configured to removably engage a fastener;
a first tray cover comprising
a connector mounting clip;
wherein the first tray base couples with the first tray cover and wherein the first tray base and the first tray cover are non-removably coupled.

2. The wire harness tray of claim 1, wherein the first tray base and the first tray cover comprise a polymer material.

3. The wire harness tray of claim 2, wherein the wire connector feature is configured to couple with a wire connector.

4. The wire harness tray of claim 1, further comprising a torque limiting feature configured to limit the amount of pressure applied to the wire harness tray by a fastener.

5. The wire harness tray of claim 4, wherein the torque limiting feature comprises an insert coupled with the wire harness tray.

6. The wire harness tray of claim 5, wherein the insert comprises a metal material.

7. The wire harness tray of claim 1, further comprising a second tray base and a second tray cover, wherein the second tray base and the second tray cover are coupled with the first tray base and the first tray cover using a wire harness tray assembly coupler.

8. The wire harness tray of claim 7, wherein the wire harness tray base coupler interlocks with the first tray base and the second tray base.

9. The wire harness tray of claim 1, wherein the connector mounting clip comprises a clip configured to couple the first tray base with the first tray cover.

* * * * *